March 12, 1968  T. W. J. KENNEDY ET AL  3,373,427
DELAY LINE CANCELLER FOR RADAR SYSTEM
Filed Nov. 23, 1966  2 Sheets-Sheet 2

33.0 MHz

1 NS PULSES 6.6 KHz
100 NS D-C
PULSES

100 NS A-C
PULSES

|← 151.5 μs →|

INVENTORS
THOMAS W. J. KENNEDY
EDGAR J. FISCHER
JOHN O. TAYLOR
BY *Curphey + Erickson*
PATENT AGENTS United States Patent Office 3,373,427
Patented Mar. 12, 1968

3,373,427
DELAY LINE CANCELLER FOR RADAR SYSTEM
Thomas W. J. Kennedy and Edgar J. Fischer, Ottawa, Ontario, Canada, and John O. Taylor, Winchester, Mass., assignors to Northern Electric Company Limited, Montreal, Quebec, Canada
Filed Nov. 23, 1966, Ser. No. 596,536
3 Claims. (Cl. 343—7.7)

ABSTRACT OF THE DISCLOSURE

A moving target indicator, for a radar system, utilizing a delay line canceller; in which during the transmitting interval, a sample of the transmitted signal is fed through the calceller. This produces a control signal at the canceller's output which is used to control the period of the transmitted pulse signals so that the period is fully synchronized with the time delay encountered in the canceller.

---

Figure 1:
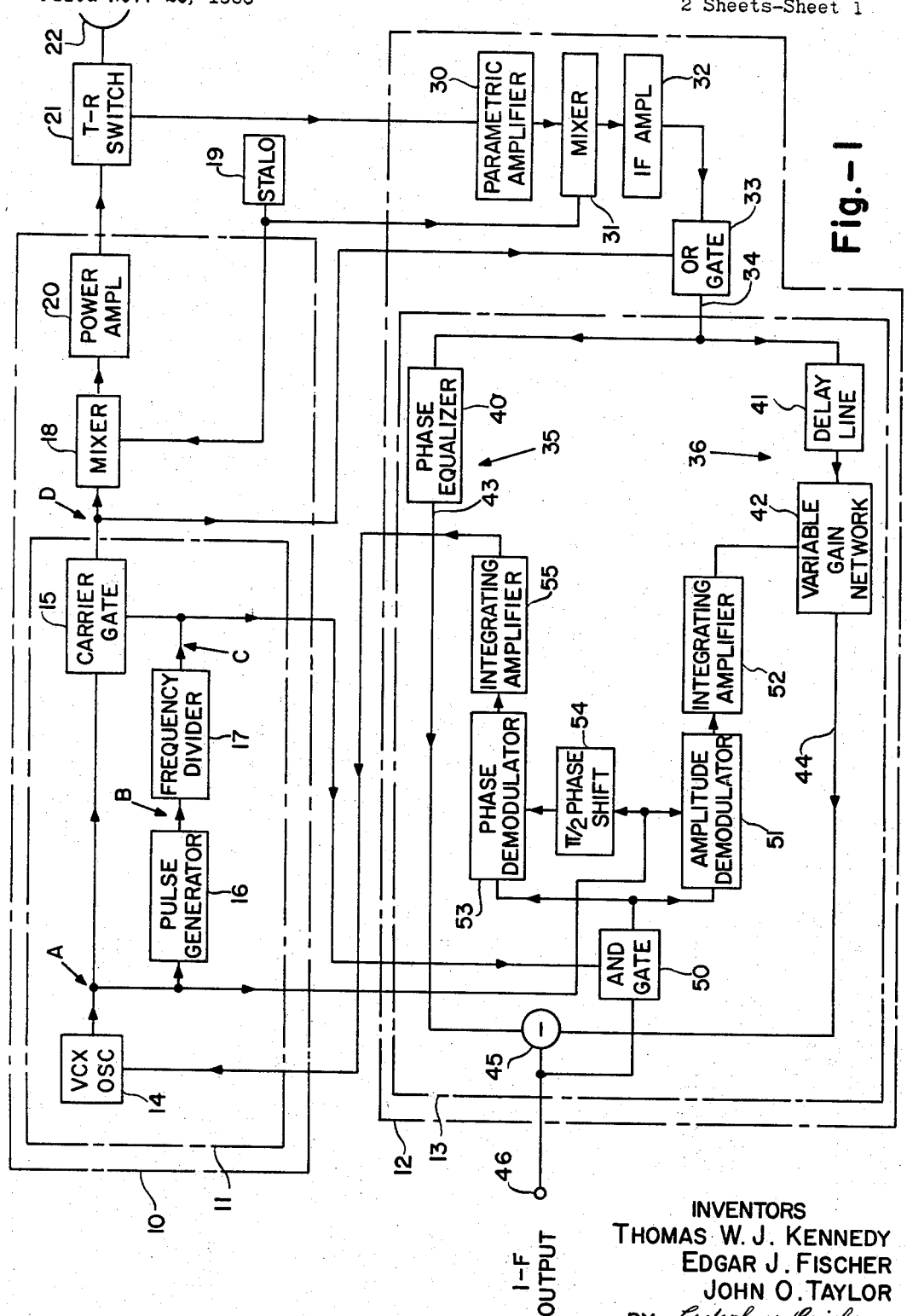

This invention relates to a moving target indicator system utilizing a radio frequency delay line canceller and more particularly to a means for synchronizing the period of the transmitted alternating current pulse signals with the time delay encountered in the delay line canceller. The invention is particularly useful in radar systems where the pulse width approaches the period of the radio frequency signal.

In a radar system, any received signal reflected from a stationary object will be exactly similar, in magnitude and phase, to the preceding one, being displaced from it in time by the period of successive transmitter pulses. On the other hand, a reflected signal from a moving object will differ from its predecessor at least in phase because the object will move through a distance between successive pulses which is not negligible compared with the transmitter wavelength. This fact is used to eliminate reflections from stationary objects so that only those from moving targets will be shown on the radar display. One way of accomplishing this is to delay the reflected signal due to one transmitter pulse by a time interval equal to the period of the pulses and then subtract it from the reflected signal due to the succeeding pulse. Thus, reflected signals from stationary objects will be cancelled out and only those from moving objects will appear on the radar display.

In the past, one of the problems encountered in such a moving target indicator system, is that the initial phase of the alternating current component varies from one transmitted pulse to the next. Hence, when one pulse is subtracted from another in the delay line canceller, a residual signal is left which appears on the radar display.

This is not a severe problem when the period of the alternating current component is relatively short compared to that of the pulse width, since the residual phase error will only account for a small portion of the total signal width. However, when very short pulse intervals are transmitted (having only a few cycles of alternating current component), a difference in phase between the alternating current components of the two signals would result in substantial residual signals which appear as moving targets on the radar display.

Still another problem is that if the period of the transmitted pulse signals does not equal the time delay in the delay line canceller, the delayed and undelayed signals reflected from stationary objects will not arrive in time coincidence at the output of the canceller, and a residual signal will result.

In addition, any variation in gain of the signal passing through the delay line portion of the canceller relative to that of the nondelay line portion, will again result in a residual signal when the two pulses are substracted from each other.

One object of the present invention is to provide means for synchronizing the alternating current signal pulses so that each one will be identical to each other in phase as well as amplitude, and also for synchronizing the period of each of the pulses with the delay line time interval, whereby identical signals returned from stationary targets will cancel out.

Another object of the invention is to provide a means for dynamically controlling the relative gain of the delayed and undelayed channels in the delay line canceller so that consecutive pulse signals returned from stationary targets will be substantially cancelled out.

In accordance with the present invention there is provided an improved moving target indicator for a radar indicator for a radar system employing a delay line canceller. The improvement comprises means for connecting a sample of the alternating current pulse signal generated by the transmitter in the radar system to the input of the delay line canceller; means for comparing the amplitude and phase of the alternating current component of this signal at the subtracted output of the canceller against the alternating current component of the transmitter pulse signal samples. Also included are means for utilizing any amplitude differential to control the relative amplitude of the two channels in the delay line canceller; and for utilizing any phase differential for controlling the period of the alternating current pulse signals so that it equals the time delay in one channel of the delay line canceller.

In one embodiment of such a system, the invention includes means for controlling the frequency of the alternating current component of the alternating current pulse signals so that it is an integral multiple of the reciprocal of the delay line period. This not only insures that the pulse signal frequency is linked to the delay line period, but that the initial phase of the alternating current component of each transmitter pulse signal is constant.

An example embodiment of the invention will now be described with reference to the accompanying drawings in which:

FIGURE 1 is a block schematic diagram of part of a radar system utilizing a delay line canceller of the present invention; and FIGURES 2A, 2B, 2C and 2D illustrate typical wave forms at various reference points in the radar system illustrated in FIGURE 1.

Referring to FIGURE 1, the radar system comprises generally a transmitter 10 which includes a generating means 11 for generating a series of alternating current pulse signals, and a receiver 12 which includes a delay line canceller 13.

The generating means 11 inculdes a voltage controlled crystal oscillator 14 which is connected to one input of a carrier gate 15 and also to a pulse generator 16. The pulse generator 16 is, in turn, connected to a frequency divider 17, the output of which is connected to the other input of the carrier gate 15. The output of the carrier gate 15 is connected to an input of an upconverter mixer 18 which is driven by a stable local oscillator or stalo 19. The output from the mixer 18 is coupled to a power amplifier 20, which in turn is connected through a transmit-receive or T-R switch 21 to an antenna 22.

Input to the antenna 22 is coupled back through the T-R switch 21 to the input of the receiver 12 where it is coupled through a parametric amplifier 30. The amplifier 30 is connected to an input of a down-converter mixer 31 which is also driven by the stalo 19. The output of the mixer 31 is coupled through an IF amplifier 32 to one input of an OR gate 33 which, in turn, is connected to the input 34 of the delay line canceller 13. The other input to the OR gate 33 is derived from the output of the carrier gate 15.

The input 34 of the delay line canceller 13 is connected to two channels; an undelayed channel 35 which includes a phase equalizer 40, and a delayed channel 36 which includes a delay line 41 and a variable gain network 42.

The phase equalizer 40 is connected to the output 43 of a subtractor network 45 which is connected at its outwork 42 is connected to the output 44 of the delayed channel 36. The outputs 43 and 44 are connected to the input of a subtractor network 45 which is connected at its output to the IF output 46.

The delay line canceller 13 also includes an AND gate 50 having one input connected to the IF output 46 and the other input connected to the output of the frequency divider 17. The output of the AND gate 50 is connected to one input of an amplitude demodulator 51 which utilizes as its reference signal the output of the voltage controlled crystal oscillator 14. The output of the amplitude demodulator 51 is coupled through an integrating amplifier 52, the output of which is used to control the variable gain network 42.

The output of the AND gate 50 is also connected to a phase demodulator 53 that utilizes as its reference signal the output of the voltage controlled crystal oscillator 14 which has been phase shifted by a $\pi/2$ radian phase shift network 54. The phase demodulator 53 is, in turn, connected through an integrating amplifier 55, the output of which is used to control the frequency of the voltage controlled crystal oscillator 14.

Figure 2A:
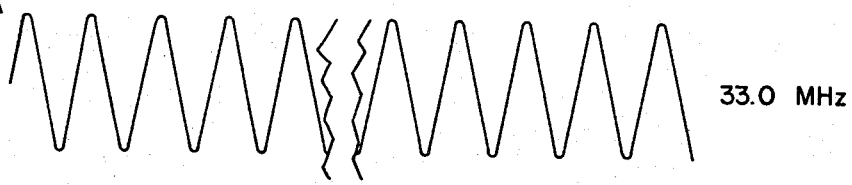
Figure 2B:
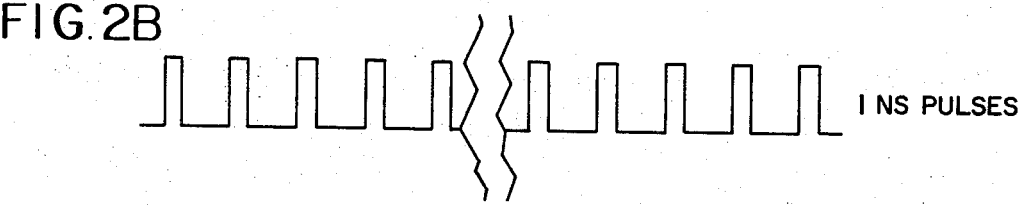
Figure 2C:
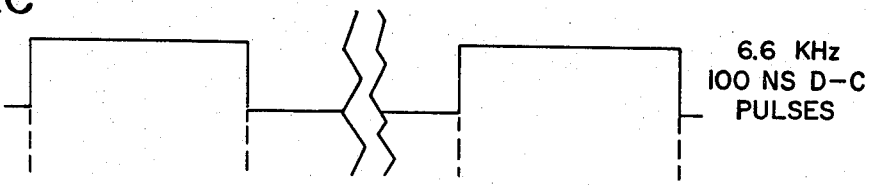
Figure 2D:
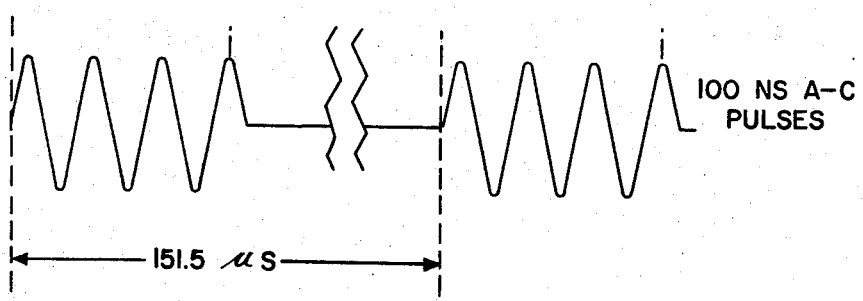

FIGURE 2A illustrates a typical sine wave output from the voltage controlled crystal oscillator 14 at reference point A of FIGURE 1. In a typical embodiment, this oscillator 14 produces a signal having a frequency of 33.0 mHz. In order to obtain the pulse repetition frequency signal, one output from the voltage controlled crystal oscillator 14 is fed to the pulse generator 16 which produces at its output, reference point B, a series of 1 nanosecond pulses as shown in FIGURE 2B. These pulses are then frequency divided by the frequency divider 17 by a ratio of 5000 to produce at its output, reference point C, a series of 100 nanosecond D-C gating pulses having a pulse repetition rate of 6.6 kHz. as shown in FIGURE 2C. The signal from reference point A is fed to the carrier gate 15 which is gated by the signal from reference point C so as to produce at its output, reference point D, a series of alternating current pulse signals having an A-C component of 33.0 mHz., a duration of 100 nanoseconds, and a period of 151.5 microseconds as shown in FIGURE 2D. By using the signal of FIGURE 2A from the voltage controlled crystal oscillator 14 to generate the D-C gating pulses of FIGURE 2C, the alternating current pulse signals of FIGURE 2D are always gated at the same initial phase, thus insuring that the return signals from a fixed object are always of the same phase. This would not occur if the D-C gating pulses as illustrated in FIGURE 2C were free-running with respect to the A-C signal of FIGURE 2A.

During operation of the radar system, signals from the generating means 11 as shown in FIGURE 2D are upconverted by the mixer 11 to the final carrier frequency and after being amplified by the power amplifier 20 they pass through the T-R switch 21 and are transmitted by the antenna 22 in a well known manner. Received signals from either stationary or moving objects, are fed from the antenna 22 through the T-R switch 21 to the receiver 12. They are first amplified by the parametric amplifier 30 and are then downconverted by the mixer 31 to the IF frequency. Since the stalo 19 is common to both the upconverter mixer 18 and the downconverter mixer 31, IF signals reflected from stationary objects (which do not undergo any Doppler shift) will be identical in frequency to those at the output of the carrier gate 15 as shown in FIGURE 2D.

The IF signals from the amplifier 32 are coupled through the OR gate 33 to the input 34 of the delay line canceller 13 where they are split, one half passing through the undelayed channel 35 and the other through the delayed channel 36. The signals from the channel outputs 32 and 33 are then subtracted by the substractor network 45. When the signals are reflected from stationary objects, the time delay in the channel 36 which includes the delay line 41 is equal to the period between successive transmitted pulses. Thus, successive pulses will appear in phase at the outputs 43 and 44 and will thus be cancelled at the IF output 46.

When a Doppler phase shift is encountered due to reflection from a moving object, the time delay between the reception of successive pulse signals will not equal that of the delay line 41, and the IF signals reflected from the moving object will not be identical in frequency to those at the output of the carrier gate 15. Hence, complete cancellation of the two signals will not take place and an output from the IF output 46 will be obtained.

Complete cancellaion will only occur when the period of the signal from the carrier gate 15 is equal to the time delay of the delay line 41, the initial phase of the alternating current component of each pulse signal at D is a constant, the received IF signals reflected from targets are identical in frequency to those at the output of the carrier gate 15, and the gains of the two channels 35 and 36 are equal. If any of these conditions do not exist, a residual output from the subtractor network 45 will be obtained.

To insure this, the present invention provides that during the transmission interval, alternating current pulse signals from the carrier gate 15 are coupled to the input 34 of the delay line canceller 13 through the OR gate 33. Simultaneously, D-C pulse signals from the frequency divider 17 open the AND gate 50 so as to couple any residual signals from the output of the subtractor network 45 to inputs of the amplitude demodulator 51 and the phase demodulator 53. Additionally, reference signals from the voltage controlled crystal oscillator 14 are coupled directly to the amplitude demodulator 51 and indirectly through the $\pi/2$ phase shift network 54 to the phase demodulator 53. If the time delay in the delayed channel 36 relative to that in the undelayed channel 35 is not equal to the period of the alternating current pulse signal from the generating means 11, successive signals will not completely cancel at the output of the subtractor network 45. This residual signal will be coupled through the AND gate 50 and appear, in quadrature phase with respect to the reference signal from the $\pi/2$ phase shift network 54, in the phase demodulator 53. A phase error signal will then be coupled from the phase demodulator 53 and after passing through the integrating amplifier 55 will be used to control the frequency of the voltage controlled crystal oscillator 14. This in turn alters the repetition frequency of the D-C pulses from the frequency divider 17 until the period thereof is equal to the time interval of the delay line 41.

Similarly, a difference in gain between the two channels 35 and 36 results in an output signal from the subtractor network 45 which is coupled through the AND gate 50 to the amplitude demodulator 51 where it is referenced against a signal from the voltage controlled crystal oscillator 14. Any residual output from the subtractor network 45 which is in phase with that of the voltage controlled crystal oscillator 14, results in an amplitude error signal which is coupled through the integrating amplifier 52 and is used to control the variable gain network 42 until the gain of the two channels 35 and 36 is equal.

In this manner the period of the alternating current pulse signal from the generating means 11 is made to the time delay interval between the two channels 35 and 36. Also, the gain of the two channels 35 and 36 is monitored and maintained equal on a pulse signal frequency basis. In addition, since the carrier gate 15 is triggered by the output of a frequency divider 17 which in turn is controlled by the voltage controlled crystal oscillator 14, the phase of the alternating current component of each pulse signal, illustrated in FIGURE 2D, will be constant. This permits the use of alternating current pulse signals having a very short time duration relative to the alternating current component thereof in moving target indicator pulsed radar systems, thus permitting the accurate tracking of high velocity targets with very short time interval pulse signals having a high pulse repetition frequency. It also improves the stationary target cancellation capabilities of moving target indicator pulsed radar systems utilizing intermediate frequency delay line cancellers and longer pulse widths. This invention furthermore permits conversion of more conventional moving target indicator pulsed radar systems utilizing video delay line cancellers to superior performance systems utilizing intermediate frequency delay line cancellers.

In the example embodiment, the system has been described utilizing a single delay line canceller. The system can, however, be readily extended to multiple delay line cancellers in which the IF output 46 would be fed to one or more cascaded delay line cancellers utilizing two channels similar to channels 35 and 36. If the additional channels are adequately matched in performance to those of the delay line canceller 13, the single amplitude error signal derived from the amplifier 52 can be used to control the gains of all the channels in the chain.

What is claimed is:

1. In a radar system comprising: a transmitter having generating means for generating a series of alternating current pulse signals for transmission by said transmitter; a receiver for receiving said alternating current pulse signals reflected from an object; said receiver including a delay line canceller for cancelling out received alternating current pulse signals reflected from stationary objects, said delay line canceller having a pair of channels each having a common input and a separate output, one of said channels having a predetermined time delay relative to the other of said channels; said delay line canceller also having subtractor means for subtracting signals from the output of each of said channels to produce an output signal; the improvement comprising: means for connecting the alternating current pulse signals from said generating means to said common input; comparison means for producing an amplitude error signal and a phase error signal which are proportional to the amplitude and the phase respectively of the alternating current components of said output signals produced by said generating means, relative to that of said alternating current pulse signals from said generating means; variable gain means responsive to the amplitude error signal for balancing the gain of each of said channels; and means responsive to the phase error signal for controlling the frequency of said generating means so that the period of said alternating current pulse signals equals the predetermined time delay.

2. A radar system as defined in claim 1 in which the generating means comprises a voltage controlled oscillator for generating an alternating current signal, the frequency of which is controlled by said phase error signal; a pulse generator responsive to said alternating current signal for producing a first series of pulses; a frequency divider responsive to said first series of pulses for producing a second series of pulses subharmonically related to said first series of pulses, each of said second series of pulses having a predetermined width; gate means responsive to said alternating current signal and said second series of pulses for producing said alternating current pulse signals.

3. A radar system as defined in claim 2 in which the comparison means comprises: an amplitude demodulator and a phase demodulator, means for connecting the output signal from the subtractor means to one input of both the amplitude demodulator and the phase demodulator, means for connecting the alternating current signal from said voltage controlled oscillator to another input of said amplitude demodulator and through a $(2N-1)\pi/2$ phase shift network to another input of said phase demodulator (where N equals an integral number), first integrating means for coupling the amplitude error signal from said amplitude demodulator to the variable gain means, and second integrating means for coupling the phase error signal from the phase demodulator to the voltage controlled oscillator.

No references cited.

RODNEY D. BENNETT, *Primary Examiner.*

C. L. WHITHAN, *Assistant Examiner.*